D. MAGNER.
Horse Hoof Expander.

No. 229,832.

Patented July 13, 1880.

Witnesses,
Chas. H. Shepard
Wm. J. Armstrong

Inventor,
Dennis Magner

UNITED STATES PATENT OFFICE.

DENNIS MAGNER, OF BROOKLYN, NEW YORK.

HORSE-HOOF EXPANDER.

SPECIFICATION forming part of Letters Patent No. 229,832, dated July 13, 1880.

Application filed January 28, 1880.

*To all whom it may concern:*

Be it known that I, DENNIS MAGNER, residing in Brooklyn, Kings county, and State of New York, have invented a new and useful Improvement in Spreaders for Curing and Counteracting Contraction in Horses' Feet, of which the following is a specification.

The nature of my invention consists in so constructing the spreading-tongs for spreading the shoe that the required pressure can be more perfectly exerted upon either heel of the shoe to expand either side of the hoof without any danger of straining or spreading the opposite side or quarter of the hoof except as desired.

Figure 1:
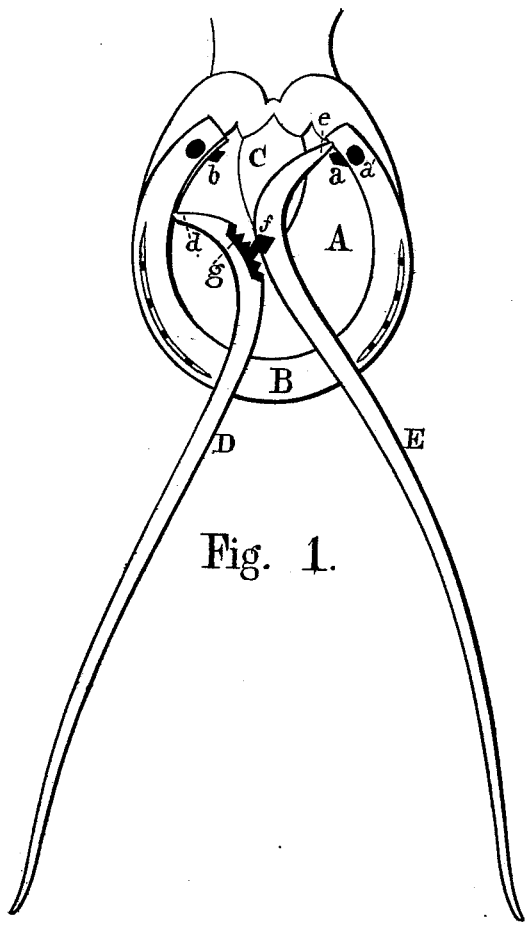
Figure 2:
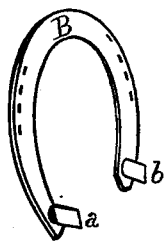
Figure 3:
Figure 4:
Figure 5:
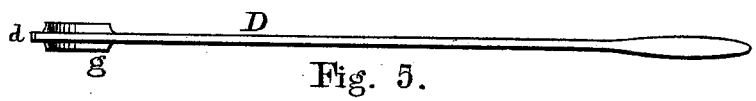

In the accompanying drawings, in which similar letters of reference indicate like parts, Figure 1 represents the foot of a horse having a shoe for spreading the hoof applied to the same, and showing the spreading-tongs in position to spread the right-hand side of the shoe and hoof. Fig. 2 shows the construction of horseshoe to be used in spreading the hoof to cure contraction. Fig. 3 shows the clip $a$ removed from the shoe. Figs. 4 and 5 show edge views of the two portions of my improved spreading-tongs for spreading the shoe and hoof.

A represents a horse's foot shown from beneath. C represents the frog of the same. B represents a horseshoe with clips $a\ b$ applied to the upper face of each heel of the horseshoe.

The clip $a$ is formed with a shank, $a'$, which is formed to fit into a hole drilled or punched in the heel of the horseshoe, and the clips $a\ b$ are firmly riveted into place after the shoe has been fitted to the foot of the animal. For construction of the clips $a\ b$ see Figs. 2 and 3.

D and E represent the two arms of the spreading-tongs which I use for spreading the shoe and hoof. The two sides or arms of the spreading-tongs rest together on a fulcrum, $f$, formed upon the arm E, fitting into notches $g$, formed on the arm D.

The hoof of a horse is formed somewhat in the shape of a truncated cone, larger at the base than at the upper portion of the hoof.

When an ordinary shoe is nailed onto the hoof the hoof will, of course, continue to grow. As the hoof grows the base should naturally expand. The ordinary shoe, nailed firmly to the base of the hoof, interferes with the natural expansion of the hoof as it grows. The hoof is therefore contracted and forced inward at the heel, causing what is termed "contraction of the hoof," and giving the animal great suffering and pain.

My improved method of curing contraction is as follows: First fit to the hoof to be operated upon an ordinary shoe, or the sides of the shoe may be formed somewhat narrower than common, so as to be more easily bent. Fit the shoe carefully and accurately to the base of the hoof, all ready to be nailed in place. When the shoe is in position, and before being nailed to the hoof, mark with a pencil or marker directly over the bar or inside wall of the heel on each side. This done, accurately drill or punch two holes—say about one-quarter of an inch in diameter—through the heels of the shoe where the marks were made. The holes can be made on the bevel of the inside wall of the heel, or the clips $a\ b$ can be inclined from the stem $a'$. Place the stems of the clips $a\ b$ into the holes thus formed and rivet firmly in place from the lower side of the shoe. The clips are now exactly where they are wanted, and when the shoe is laid on should come inside each heel and extend well up to the top of the arch connecting the frog with the heel. I am careful to have the clips fitted until they rest perfectly up against the point of the heel, so as to give an easy and perfect pressure with the full breadth and length of the clip against the horn. The end of the clip must not touch the soft part above. I now place the shoe in position and nail it firmly in place.

Were the clips $a\ b$ formed permanently onto the upper surface of the shoe, or allowed to project above the upper surface of the shoe before the shoe had been fitted to the hoof of the animal, the clips would interfere with the proper fitting of the shoe to the base of the hoof, while by my method of using attachable clips the shoe is perfectly fitted before the clips are applied.

It will be readily seen that the heels of the hoof must now spread as far as the shoe is opened, and that we have the power to open the quarters of the hoof as much or as little as may be desired. Were tongs now placed between the heels of the shoe the pressure to expand the shoe would come equally upon both sides of the shoe. The side of the shoe that was the weaker or thinnest side would do all the bending, and it would be almost impossible to form a shoe with sides of exactly equal strength. If such a shoe were expanded by direct pressure between the two heels of the shoe, pressure only would be brought on the quarter of the hoof outside the weaker side of the shoe, or the part so bending outward. This would not answer the purpose. It is important to open either or both quarters of the hoof as little or as much as may be desired, and with absolute certainty. To accomplish this I use spreaders constructed as shown in Fig. 1.

Place the point e of the spreader-arm E against the right-hand heel of the shoe, and place the point d of the arm D against the opposite edge of the shoe, near the central portion of the left-hand side. The fulcrum f is placed in one of the notches, g, formed on the arm D, as shown in Fig. 1. I now press the handles or arms D and E together. The right-hand side or heel of the shoe will be straightened by this operation, and the heel on this side will be forced outward and expanded. The left-hand heel of the shoe will not have been affected in the least by this operation. I now reverse the spreader-tongs, placing the point e on the left-hand heel of the shoe, and the left-hand heel of the shoe can be expanded in a similar manner. Thus either side of the shoe, and therefore either quarter of the hoof, can, by my improved method, be expanded accurately to any degree required without any danger of overstraining the opposite quarter of the hoof.

The heel of the shoe should be spread but very little at first; but after the shoe has been attached either or both sides of the shoe and hoof can be expanded gradually from day to day, carefully measuring each time to see how much expansion is being applied. This process will sometimes enable the operator to expand a horse's hoof a half an inch or more by a succession of operations, relieving the undue pressure upon the internal portions of the foot, relieving contraction, and proving invaluable, in many cases, for the relief of the animal, and for restoring to him strong and healthy feet.

I do not in this patent claim the horseshoe shown and described, but reserve it as the subject of a separate application.

Having thus described the nature and operation of my improved method of curing contraction, what I claim as my invention, and desire to secure by Letters Patent, is—

The spreader-tongs formed of arms E and D, with fulcrum f formed upon one arm, notch or notches g formed upon the other arm, and short ends or points a d, curved outward to rest against the inner edges of the shoe for spreading the same, substantially as described.

DENNIS MAGNER.

Witnesses.
  CHAS. H. SHEPARD,
  WM. J. ARMSTRONG.